ized Patent

United States Patent
Marzocchi et al.

[15] 3,675,704
[45] July 11, 1972

[54] TIRE CONSTRUCTIONS

[72] Inventors: Alfred Marzocchi, Cumberland; Gustav E. Benson, Edgewood; Robert E. Leach, Cumberland, all of R.I.

[73] Assignee: Owens-Corning Fiberglas Corporation

[22] Filed: May 8, 1970

[21] Appl. No.: 48,707

Related U.S. Application Data

[62] Division of Ser. No. 706,160, Feb. 16, 1968, Pat. No. 3,523,472.

[30] Foreign Application Priority Data

Feb. 17, 1967 Belgium....................................39909

[52] U.S. Cl..............................152/361, 152/354, 152/359
[51] Int. Cl..........................................B60c 9/12, B60c 7/00
[58] Field of Search....................................152/361, 359, 354

[56] References Cited

UNITED STATES PATENTS

| | | |
|---|---|---|
| 2,541,506 | 2/1951 | Cuthbertson et al. ...........152/361 |
| 3,029,590 | 4/1962 | Caroselli et al. ...............152/359 |
| 3,095,026 | 6/1963 | Weber ...........................152/361 |
| 3,095,027 | 6/1963 | Weber ...........................152/361 |
| 3,392,774 | 7/1968 | Le Bosse .......................152/361 |
| 3,426,825 | 2/1969 | Leibee ..........................152/361 |

*Primary Examiner*—Drayton E. Hoffman
*Attorney*—Staelin & Overman and Paul F. Stutz

[57] ABSTRACT

Tire constructions featuring glass reinforcement in the form of a tread reinforcing band, in the form of load supporting stiff toroidal hoops, in the form of a spiral wrap for organic cord plies and/or in the form of a plurality of non-woven plies of mutually parallel cords.

4 Claims, 13 Drawing Figures

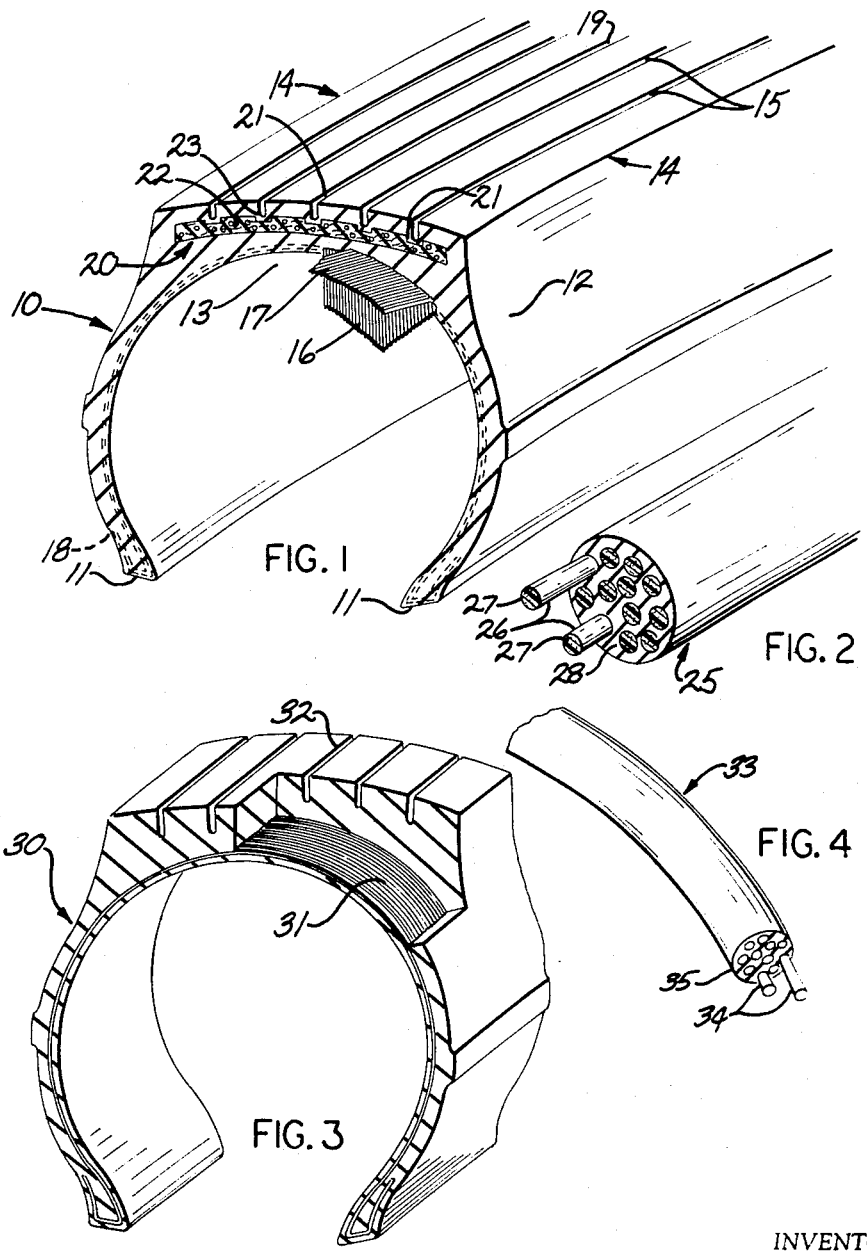

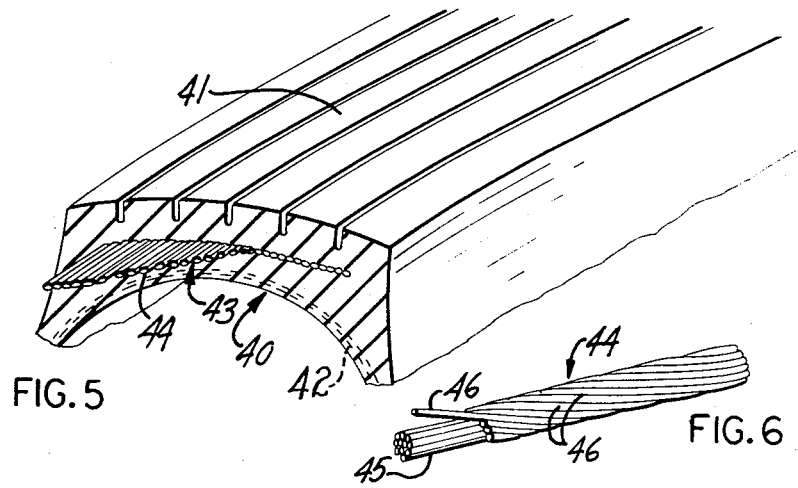
FIG. 5
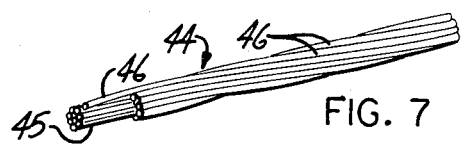
FIG. 6
FIG. 7
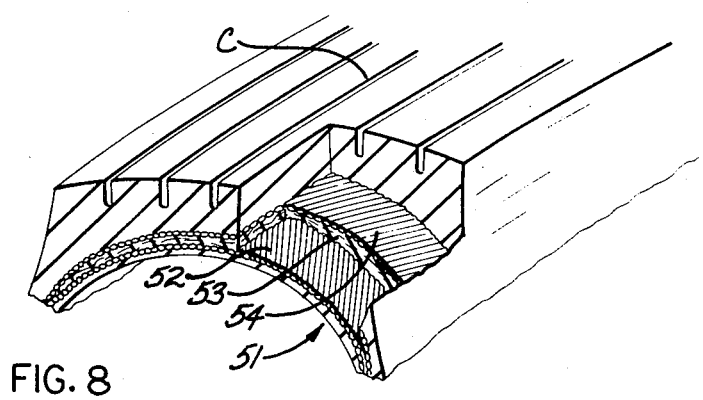
FIG. 8

INVENTORS
ALFRED MARZOCCHI
GUSTAV E. BENSON
ROBERT E. LEACH
BY
ATTORNEYS

TIRE CONSTRUCTIONS

This is a division of co-pending application Ser. No. 706,160, filed Feb. 16, 1968, now U.S. Pat. No. 3,523,472.

As is well known, tires for vehicles wheels are formed of rubber combined with various reinforcement materials, such as woven fabrics and cords, formed of assemblies of organic fibers, threads, strands, yarns, and the like. The conventional tire reinforcement materials include cotton, rayon, nylon, polyester, modified nylons and acrylic resins. More recently, glass in the form of fibers, strands, yarns, and cords has been suggested as a candidate for reinforcing rubber.

Glass possesses, as a fiber, some properties which are extremely attractive in this regard. Thus, fiber glass has a strength of in the neighborhood of 400,000 pounds per square inch, an impact resistance of 3.95 foot pounds times $10^{-4}$/denier, a modulus of 8.45 psi times $10^{-6}$. Additionally, glass has a high dimensional stability and the fibers are relatively inert to temperature or humidity changes. On the other hand, glass is quite stiff, namely, having a value of 322 grams per denier; while the other organic fiber reinforcements have values of 60 or below. Also, glass is quite non-stretchable, breaking at about 3–4 percent elongation, while the organic fibers will elongate to 15–40 percent. Glass is also quite heavy, having a specific gravity of 2.54, while the organics are generally 1.5 or lower. The organics are also considerably tougher than glass, generally from two to 10 times. By toughness is meant the elongation times the load at failure divided by two.

Having in mind the advantages and, as well, the differences between glass and organics, it is an object of the present invention to provide particular tire constructions employing glass in one or more forms as a reinforcement for tires.

It is a particular object of the present invention to provide particular glass reinforcement structures which permit their incorporation into tires in a manner as to provide improved performance, both in terms of ability to withstand abuse, high performance under dynamic conditions and extended mileage.

It is additionally an object of the present invention to provide a large number of reinforcement systems employing glass in an optimum form as to permit the attainment of the desirable attributes referred to.

The foregoing, as well as other objects of the present invention, will become apparent to those skilled in the art from the following detailed description taken in conjunction with the annexed sheets of drawings on which there are presented, for purposes of illustration only, several variant embodiments of the present invention.

IN THE DRAWINGS

FIG. 1 is a perspective view of a tire shown partially in section and partially broken away for purposes of disclosing interior reinforcement constructions representing one embodiment of the present invention;

FIG. 2 is an enlarged perspective view of a particular reinforcement member for tires; said reinforcement member including glass as a component;

FIG. 3 is a perspective view similar to FIG. 1, but illustrating another reinforcement embodiment of the present invention;

FIG. 4 is a view like FIG. 2, but showing one of the reinforcement members present in the tire illustrated in FIG. 3;

FIG. 5 is a perspective view similar to FIGS. 1 and 2 illustrating a reinforcement construction in accordance with another embodiment of the present invention;

FIG. 6 is an enlarged perspective view of a reinforcement member employed in the tire shown in FIG. 5;

FIG. 7 is a view similar to FIG. 6, but showing the configuration of the reinforcement member after vulcanization;

FIG. 8 is a perspective view, partly in section, of a tire construction showing the constructional details of a reinforcement system constituting a further embodiment of the present invention;

The present invention envisions particular forms of glass as to constitute ideal reinforcement. The invention further envisions a combination of rubber and glass as a preformed member which may be ideally incorporated into a tire in a particular location as to yield the desired attributes in terms of extended mileage and high dynamic performance.

Figure 13:
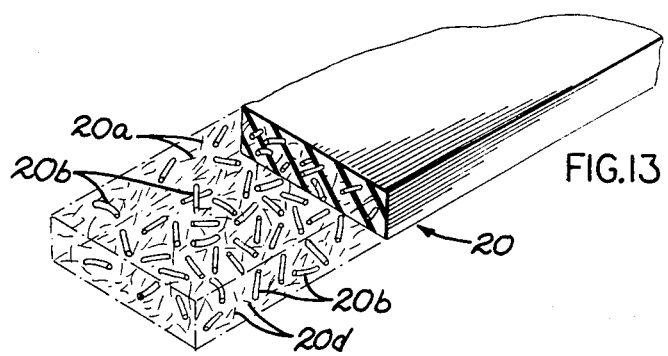
FIG. 13 is an enlarged perspective view showing the interior content of one of the rubber/glass reinforcement members utilized in the embodiments illustrated in FIGS. 1 and 8.

Referring now more specifically to the drawings, there is disclosed in FIG. 1 a tire 10 composed of spaced ring-like bead members 11 connected generally by a carcass 12 extending in toroidal fashion from bead to bead. The carcass 12 bears in the crown portion 13 a ground contacting tread 14 which is peripherally grooved as at 15 to define the tread as disclosed. The carcass 12 includes carcass plies 16 and 17 shown in dotted outline which proceed from bead to bead in the manner illustrated and being turned up about the bead as at 18. The plies 16 and 17 are each composed of parallel cords. The cores in the plies 16 extend at one angle with respect to the peripheral centerline 19 of the tread 14, while the cords in the plies 17 extend at an opposite but equal angle to the peripheral centerline 19. In accordance with one embodiment of the present invention, there is included in the crown region, that is, extending from shoulder to shoulder, a band or belt 20 which is situated just above the carcass plies 16 and 17 and just beneath the tread 14. The band 20 is relatively thin and extends peripherally about the tire. Similar bands are frequently known as tread plies or breaker strips. A particular belt ply 20 or band in accordance with the present invention contains a plurality of side-by-side peripheral grooves 21 corresponding in number to the number of grooves 15 in the tread. Furthermore, the band is situated such that the thicker region 22 between the grooves extends upwardly beyond the root 23 of the tread groove 15. Thus, the grooves of the tread extend down into the grooves in the band. The band 20 is formed, of course, of a rubber or elastomer which is generally compatible with the elastomer of rubber making up the major portion of the tire. Most preferably, the elastomer is so constituted as to be somewhat higher in modulus than the principal body portion of the tire as to thus impart to the tire a stiffening or rigidifying effect just beneath and extending upwardly into the tread region. This will have the effect of overcoming the tendency of the grooves in the tread to collapse and exhibit the so-called squirming or reduction in lateral contact with the payment. Thus, the tread portion of a tire when rolling over a surface and subjected to a sudden load, as by an application of brakes or a sudden acceleration, tends to vary in terms of the configuration of the "footprint" defined by the tread on the surface. Generally speaking, the tire deflects inwardly at that region which is in contact with the pavement. When at rest, the "footprint" is a square or a rectangle. When load is exerted as described, the central region of the rectangle tends to neck inwardly so that there is not as much rubber in contact with the pavement. In other words, there is a reduction in the total area in contact with the pavement. This is due to the collapse or bowing inwardly of the grooves. With the band member 20 of the tire of the present invention, this tendency is reduced or eliminated altogether. Most desirably, the band 20 is formed, as indicated, of a compatible elastomer but containing a proportion of glass. Most preferably, the glass is in two forms. One proportion ranging say from 5–10% is in the form of discrete individual filaments ranging from say one-quarter to an inch to 1.0 in length. The other proportion of glass ranging up to 30 percent is composed of one-fourth to three-fourths inch chopped cords composed of glass. By chopped cords, I mean, for example, a continuous cord composed of a plurality (say three) of twisted together strands, each strand in turn being composed of a plurality (say 10) of yarns, the yarns in turn being composed of 200 or so or 400 or so filaments. The cords are formed on conventional twisting apparatus and then the lengths of cord are chopped to say one-quarter to an inch in length. The band 20 may be initially formed on a rubber mill by adding the appropriate rubber forming ingredients to form a millable composition. To this is added 5–10 percent of chopped cords which are worked sufficiently to break up the cords into the individual filaments. Then 20–30 more parts of cords are added and the stock given another one or two passes whereby the cords retain their cord identity. The composition is then removed from the mill and will have an appearance as illustrated schematically in FIG. 13, wherein the reference numeral 20a identifies individual filaments and the reference numeral 20b identifies individual chopped cords. The sheet removed from the mill can be cut into appropriate widths and then grooved either by knives or preformed in a cold mold to give the grooved configuration as shown in FIG. 1. A length of this is then wrapped about the tire during the "green" tire building process, using the so-called "flat band" process.

The carcass plies 16 and 17 may be formed of cords of rayon, nylon or the like held together by a calendered on rubber stock.

In accordance with a further embodiment of the present invention, the cords in the carcass ply take the form of the member illustrated in FIG. 2 and identified by the reference numeral 25. The reinforcement member 25 is composed of a plurality of cylindrical elements 26. These in turn are composed of strands, yarns or cords of glass 27 embedded in a plastic matrix to separate the individual fibers, yarns or strands of glass from each other. The plastic matrix may be, for example, an epoxide, which is cured while the glass elements are held in tension. A plurality of the resin glass members 26 are then embedded in a rubber matrix identified by the reference numeral 28 in such manner as to hold them in slightly spaced relationship. The members 26 are continuous and extend longitudinally of the rubber matrix 28 to define the complete linear reinforcement member 25. A plurality of the members 25 may be combined together to form a carcass ply 16 or 17. This may be done by arranging them in parallel and calendering a layer of rubber thereabout. Alternatively, they may be woven with an occasional warp thread to hold the ply together.

Under certain circumstances, it may be desirable to expose the linear member 25 to a partial cure. Then when incorporated into a tire during the tire building process and ultimately cured, the members become integrally a part of the tire. The completed tire then will contain the members 25, creating, as it were, the glass yarns, strands or cords completely isolated from each other, yet situated at the desired cord angle within the tire as to lend the proper reinforcement.

Referring now to FIG. 3, there is disclosed a radial tire incorporating reinforcement in accordance with this invention. The individual parts of the tire, such as the beads, side wall and tread, will not be particularly described since these have already been discussed in FIG. 1. Suffice it to say that the tire 30 of FIG. 3 incorporates a radial carcass ply 31. The radial carcass ply is composed of a large plurality of side-by-side cords which extend from bead to bead on a line perpendicular to the peripheral centerline 32 of the tread. An individual cord 33 is shown greatly enlarged in FIG. 4. This cord or reinforcing member is composed of a plurality of individual cords, yarns or strands of glass 34 embedded in a hardened plastic, such as an epoxide 35. A given length of the reinforcement member 33 is fairly stiff or spring-like. When the member 33 is incorporated as a radial reinforcement 31 and wrapped about the bead as at 36, the hoop-like reinforcement will, considering the great plurality thereof arranged within the tire, provide a load supporting characteristic without the necessity of inflating the tire interior with air.

Referring now more particularly to FIGS. 5, 6 and 7, there is disclosed another embodiment of the present invention wherein there is envisioned a tire 40 having a tread 41 and carcass ply 42 and, as well, a tread reinforcing belt or ply 43 extending generally from shoulder to shoulder. The tread reinforcing ply 43, or breaker strip, is composed of a plurality of linear reinforcement members extending peripherally or circumferentially about the tire just beneath the tread. One of the side-by-side reinforcement members 44 is shown greatly enlarged in FIG. 6. The reinforcement member 44 is composed of an inner core composed of a gathered together assembly of organic strands or yarns as, for example, nylon, rayon, polyester, etc. These linear yarns or strands are in continuous relationship. Wound about the assembly of organic elements in spiral form is a plurality of yarns, strands or cords formed of glass. These are identified by the reference numeral 46. The organic core is identified by the reference numeral 45. The structure 44 is employed either as the carcass ply or as a breaker strip or belt ply 43. The advantages of this structure is that during vulcanization or cure the organic elements 45 when subjected to the heat become somewhat limp or stretchable. As curing proceeds and the tire is pushed into the confines of the mold, this material stretches causing the glass to extend itself into a more acute angle with the structure to assume a configuration somewhat as shown in FIG. 7. The consequence of this is that the glass assumes a tensioned alignment or loading within the tire. In some cases, the stretchable core organic material will break or be extended to its elongation limit. It will be appreciated that the reinforcement structure illustrated in FIG. 6 may be employed not only in the breaker strip assembly 43 as shown in FIG. 5, but a plurality of these in side-by-side relationship may be employed to form the bias plies 16 or 17 in FIG. 1.

A tire construction in accordance with a further embodiment of the present invention is shown in FIG. 8 and is identified by the reference numeral 51. Only a portion of the side wall and carcass has been shown in this FIG. in the interest of clarity of illustration. Thus, the lower side wall and the bead regions have been eliminated. This tire features a three-ply restriction band in the nature of a belt extending from shoulder to shoulder and peripherally about the tire over the crown region just underneath the tread. This three-ply restriction belt includes a lower ply 52 of side-by-side mutually parallel cords at a bias incline with the peripheral centerline C of the tire. The center ply 53 is a spacing layer of rubber, while the upper ply 54 is like the first ply 52 composed of a mutually parallel side-by-side array of cords also at a bias incline of the centerline C but the angle being opposite to the angle described by the cords in the lower ply. This belt or band is a unitary structure formed collaterally to the tire building operation. In accordance with a preferred embodiment, the upper and lower cord plies 52 and 54 are passed through a calender to yield a structure in which the cords are embedded in an elastomeric stock. The elastomeric stock applied by calender to each of the cord plies 52 and 54 is one that is slightly higher in modulus than the remainder of the tire proper into which it is to be ultimately incorporated. The somewhat higher modulus can be achieved by a choice of an appropriate filler. Preferably, there is employed a minor amount of glass in filament form and a somewhat greater amount of glass in the form of chopped cords; the latter being formed by assembling together a great plurality of filaments, yarns and/or strands of glass. The central ply or layer 53 may also include a proportion of discrete glass filaments and, as well, a somewhat greater proportion of the chopped cords formed of a multi-element assembly. The restriction bands as described is advantageous over prior restriction bands in that the cord plies 52 and 54 operate more as a cooperating or singular unit as opposed to just simply a plurality of reinforcing belts. Also, the cord-containing layers are amply protected in terms of contact of one cord with an adjacent cord or the cord in one ply or any cord in either ply contacting a cord or cords in the other ply.

A restriction band in accordance with the present invention is usually formed by arranging a large plurality of cords in mutually parallel relationship as drawn from a creel composed of any array of spools, each containing a continuous length of the cord concerned. The parallel spaced array of cords is then passed through a loom where a woof tying thread is passed intermeshingly between the cords to create in effect a slightly woven fabric in which the cords constitute the warp thereof. This slightly woven fabric is then cut on a bias to yield the desired cord angle for either the carcass ply or the reinforcing belt ply.

Figure 9:
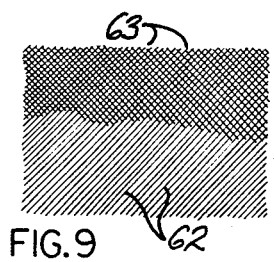
FIGS. 9, 10 and 11 are similar plan views of different reinforcement structures in accordance with the present invention.
Figure 10:
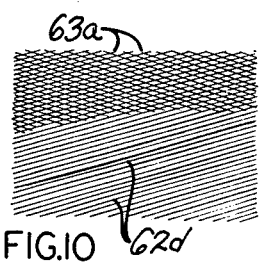
Figure 11:
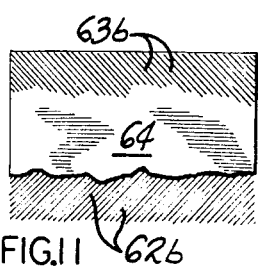

In accordance with a further embodiment of the present invention, a non-woven structure composed of parallel cords is utilized. One such structure is shown in FIG. 9. It is composed of a lower layer 62 in which the cords are arranged in mutually parallel relationship at an inclined angle and an upper layer 63 composed of mutually parallel cords angularly disposed in the opposite direction. In FIG. 10, the angular disposition of the cords in the two layers 62a and 63a is more acute than that in FIG. 9. FIG. 11 is similar to FIG. 9, but the lower layer 62b and upper layer 63b have sandwiched therebetween a thin layer 64 of an elastomer. The structures in FIGS. 9 and 10 do not employ any woof tying thread. Rather, these non-woven materials are formed by passing a pair of parallel metal bands continuously through a principal cylindrical carriage which is rotatable about its axis. On the carriage are mounted a plurality of spools containing, in each case, a continuous length of the cord. As the bands are passed in uniform fashion through the cylindrical carriage, the carriage itself is rotated and the cords are drawn continuously and wrapped about the spaced bands. As a consequence, on one side of the parallel bands, the cords will be proceeding in one direction and then on the other side, as the cord passes around the bands, the direction will be reversed. As the bands proceed away from the carriage, the structure assumes a flat configuration; that is, the array of layers of cords on either side of the two spaced bands assume face-to-face contact and are held together by a suitably applied size or spray of an adhesive. Passing further away from the rotating carriage, the two-ply cord structure is slit along its marginal edges and continuously passed divergently away from the bands which pass about a pair of rollers for return through the inlet side of the cylindrical rotating carriage bearing the large array of spools.

The angular relationship of the cords in the non-woven plied structure is adjusted by control of the speed of the belts passing through the cylindrical carriage and also by adjustment of the angular velocity of the carriage carrying the supply spools.

The sandwich structure shown in FIG. 11 is achieved by passing a sheet of rubber into the central portion of the carriage guided at its marginal edges by the spaced bands. The sheet ends up, as a consequence of the foregoing, encircled by the array of cords passing about the spaced bands.

Figure 12:
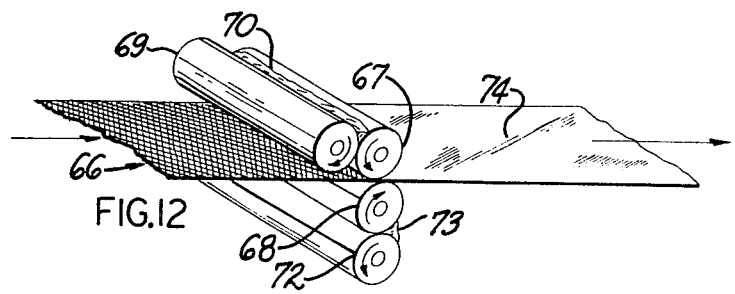
FIG. 12 is a perspective view schematically illustrating the treatment of one of the structures of FIGS. 9, 10 and 11 to further adapt it for incorporation as a reinforcement in tire constructions.

The two-ply layer of cords of FIGS. 9 and 10 or the sandwich structure of FIG. 11 can be further processed in accordance with the present invention in the manner shown in FIG. 12, wherein the non-woven two-ply structure 66 is passed between counter-rotating rolls 67 and 68 of a four-roll calender setup. Counter-rotating roller 69 cooperates with roller 67 to apply a supply of rubber stock 70 onto the upper side of the non-woven fabric 66. In like fashion, roller 72 which rotates in an opposite direction to roller 68 cooperates in sheeting out a layer of stock 73 and applying it to the lower surface of the non-woven fabric 66. Emerging from the rollers 67 and 68 is a calendered non-woven fabric 74. As indicated, the sandwich structure of FIG. 11 may be employed, in which case the ultimate product emerging from the calender setup will be a five-ply structure. The outer layers will each be rubber stock. The central layer will be rubber stock 64 and the two intermediate layers on each side of the rubber stock 64 will be the mutually parallel non-woven cords 62 and 63. This arrangement is very desirable in that no weaving operation is necessary nor is the bias cutting necessary since the angular arrangement of the cords is accomplished in one operation, requiring only either the introduction of an intermediate sheet 64 during the production of the sheet of either FIGS. 9 or 10 or the five-ply structure can be achieved by the simple expedient of passing the sandwich structure through the apparatus disclosed in FIG. 12.

Where glass in any of the foregoing embodiments is to be employed as the cord or reinforcement either in fiber or cord form, it is most desirable to employ a fiber which has been treated with a size as it emerges from the attenuating bushing. A suitable protective size has a formulation as follows:

EXAMPLE 1

0.5 – 2.0 percent by weight gamma-aminopropyltriethoxy silane 0.3 – 0.6 percent by weight glycerine Remainder water Furthermore, the strand, yarn or cord formed of the assembly of fibers is desirably impregnated with an elastomeric impregnant by passing the cord or yarn through a path of the appropriate impregnant selected, having in mind the ultimate composition of the elastomeric employed in manufacturing the tire. A typical elastomeric impregnant composition recipe is recited below.

EXAMPLE 2

60 parts by weight Lotol 5,440 - U.S. Rubber Company Lotol 5440 is a 38% dispersed solids system including a butadiene-styrene-vinyl pyridine terpolymer latex, a butadiene styrene latex and a resorcinol-formaldehyde resin.

39 parts by weight water

From the foregoing, it can be seen that there has been developed a number of reinforcement techniques which can be advantageously employed in conventional tire manufacturing operations. The reinforcements are employed in the area of greatest stress; namely, in the crown portion just beneath the tread. Additionally, the reinforcements have, by the particular location and composition thereof, permitted achievement of the advantage of the strength properties which glass possesses and yet accommodating those properties which set glass apart from the conventional flexible and stretchable organic reinforcement materials.

Modifications may be resorted to without departing from the spirit and scope of the present invention as defined in the appended claims.

We claim:

1. A tire construction comprising:
   a pair of spaced annular bead ring members for releasable mounting engagement with a vehicle wheel,
   a connected carcass extending toroidally from bead to bead,
   a ground contacting tread carried by said carcass at the crown portion thereof and
   a tread reinforcing belt member located between said carcass and said tread, said belt member extending generally from shoulder to shoulder of said tire as viewed in section, said belt member including a first non-woven array of mutually parallel glass cords, a second non-woven array of mutually parallel glass cords oppositely inclined to the cords in said first array and a layer of rubber between said first and second arrays, said glass cords of each array being embedded in calendered stock of higher modulus than the remainder of the tire construction, said layer of rubber between said first and second arrays containing lengths of glass.

2. The tire construction as claimed in claim 1, wherein said calender stock contains lengths of glass in minor amount.

3. The tire construction as claimed in claim 1, wherein said glass is present in filament and cord form.

4. The tire construction as claimed in claim 3, wherein the proportion of cord lengths predominate.

* * * * *